United States Patent [19]
Schulze

[11] 3,849,785
[45] Nov. 19, 1974

[54] PHOTOGRAPHIC CAMERA WITH PRESELECTABLE DIAPHRAGM APERTURE

[75] Inventor: Heinz Schulze, Dresden, Germany

[73] Assignee: VEB PENTACON DRESDEN Kamera-und Kinowerke, Dresden, Germany

[22] Filed: Feb. 25, 1974

[21] Appl. No.: 445,483

[30] Foreign Application Priority Data
Apr. 11, 1973 Germany............... WPG 03 b

[52] U.S. Cl................. 354/40, 354/46, 354/270, 354/272, 354/286
[51] Int. Cl...... G03b 7/02, G03b 7/20, G03b 17/14
[58] Field of Search......... 354/23, 29, 30, 272, 289, 354/46, 59, 42, 273, 39, 40, 270, 286

[56] References Cited
UNITED STATES PATENTS

| | | | |
|---|---|---|---|
| 3,498,193 | 3/1970 | Shimomura | 354/46 X |
| 3,603,234 | 2/1969 | Hennig et al. | 354/40 |
| 3,628,439 | 12/1971 | Furusawa | 354/270 |
| 3,667,365 | 6/1972 | Fujimoto et al. | 354/270 |
| 3,747,485 | 7/1973 | Suzuki | 95/10 CT |

Primary Examiner—Joseph F. Peters, Jr.
Attorney, Agent, or Firm—William Anthony Drucker

[57] ABSTRACT

A photographic camera comprises an objective lens having a preselectable aperture diaphragm, a diaphragm preselection setting device, an exposure measuring circuit including a moving coil, a photoelectric cell, a power source and a voltage adjustment device having a sliding contact, an entrainment member on said preselection setting device effective to move said sliding contact, and stop means for effecting arrest of said sliding contact in a position in which the electrical value corresponding to the photometric initial diaphragm is determined by the voltage adjustment device, the entrainment connection between the entrainment member and the sliding contact being nullified on arrest of said sliding contact.

2 Claims, 2 Drawing Figures

PHOTOGRAPHIC CAMERA WITH PRESELECTABLE DIAPHRAGM APERTURE

BACKGROUND TO THE INVENTION

The invention relates to a photographic lens with a preselection diaphragm of which the preselection setting device, for the purpose of simulating of the diaphragm values, is coupled to the sliding contact of a variable resistance or voltage divider.

With photographic lenses of this kind, systems are known in which, in order to take into account the difference between the photometric and geometrical initial aperture of the diaphragm, the adjusting elements (such as voltage divider or resistance) serving for the electrical simulation of the diaphragm values undergo a correction as regards their initial values. This measure necessitates the provision, for each type of lens, of an electrical adjusting element corrected in accordance with its particular optical properties. This type-governed design for the electrical adjusting elements proves expensive; it is therefore avoided in practice, in that the electrical adjusting elements built into different types of lens are merely adapted to one particular type of lens, the deviations caused by the optical properties of the other types being accepted as inevitable.

OBJECT OF THE INVENTION

The object of the invention is to avoid the expensive measure already known and to provide an improved device for the correction of the difference between the photometric and the geometrical initial aperture of the diaphragm.

SUMMARY OF THE INVENTION

According to the invention there is provided a photographic camera having an objective lens incorporating a preselection diaphragm of which the preselect on setting device, for the purpose of simulating the diaphragm values, is coupled to the sliding contact of a voltage adjustment device in the exposure measuring circuit wherein sliding contact of the voltage adjustment device is coupled with the preselection setting device via an entrainment connection, a stop being provided by which, when the preselection setting device is moved into the position corresponding to the geometrical initial diaphragm, the sliding contact is caused to come to a stop in that position in which the electrical value corresponding to the photometric initial diaphragm is determined by the voltage adjustment device, the entrainment connection being nullified on the arrest of the sliding contact.

BRIEF DESCRIPTION OF DRAWINGS

The invention will be explained by reference to examples illustrated in the accompanying drawings in which.

DESCRIPTION OF PREFERRED EMBODIMENTS.

Figure 1:
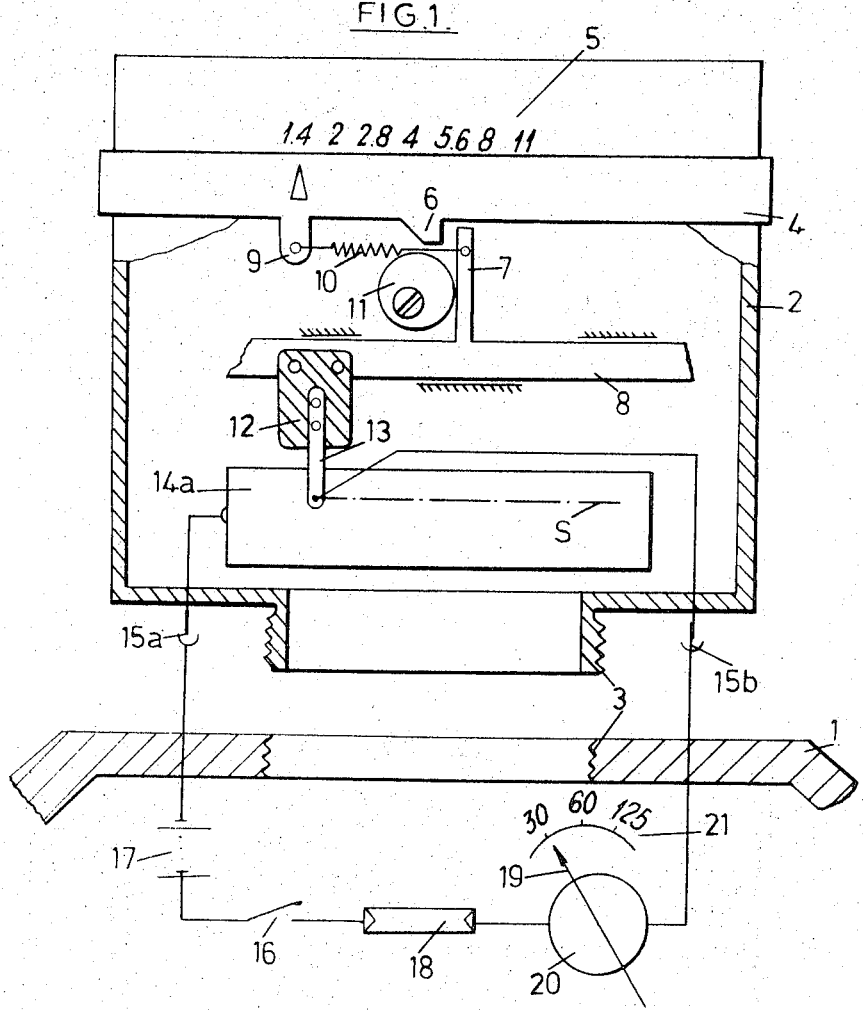
FIG. 1 shows a variable resistance connected with the preselection setting device, the required initial diaphragm having been set.

The screw threading 3 enables the taking lens 2 to be attached to the camera housing 1 (see FIG. 1). The preselection setting device 4 makes it possible, by means of the diaphragm scale 5, to select the diaphragm value to which the normally fully opened diaphragm will close when the camera shutter is released.

The entrainment device 6 for the arm 7 of the slide carrier 8 is situated on the preselection setting device 4. A spring 10 tending to keep the arm 7 in contact with the entrainment device 6 is provided between the lug 9 and the said arm 7. The stop 11, taking the form of an adjusting eccentric, is provided in the adjustment path of the arm 7. To the contact carrier 8 is attached the insulating plate 12 to which the sliding contact 13 is affixed. The sliding contact 13 moves along the slide track S on the variable resistance 14a. The said variable resistance 14a and the said sliding contact 13 are electrically connected, via the detachable contacts 15a and 15b, with the exposure measuring device provided in the camera housing 1. The exposure measuring device, fed from the battery 17, can be switched on by means of the switch 16. The photo-conductive cell 18 is so arranged that it receives the brightness of the subject, entering through the taking lens 2. The indicator 19 of the galvanometer 20 moves in relation to a scale 21 with values for different exposure times.

Figure 2:
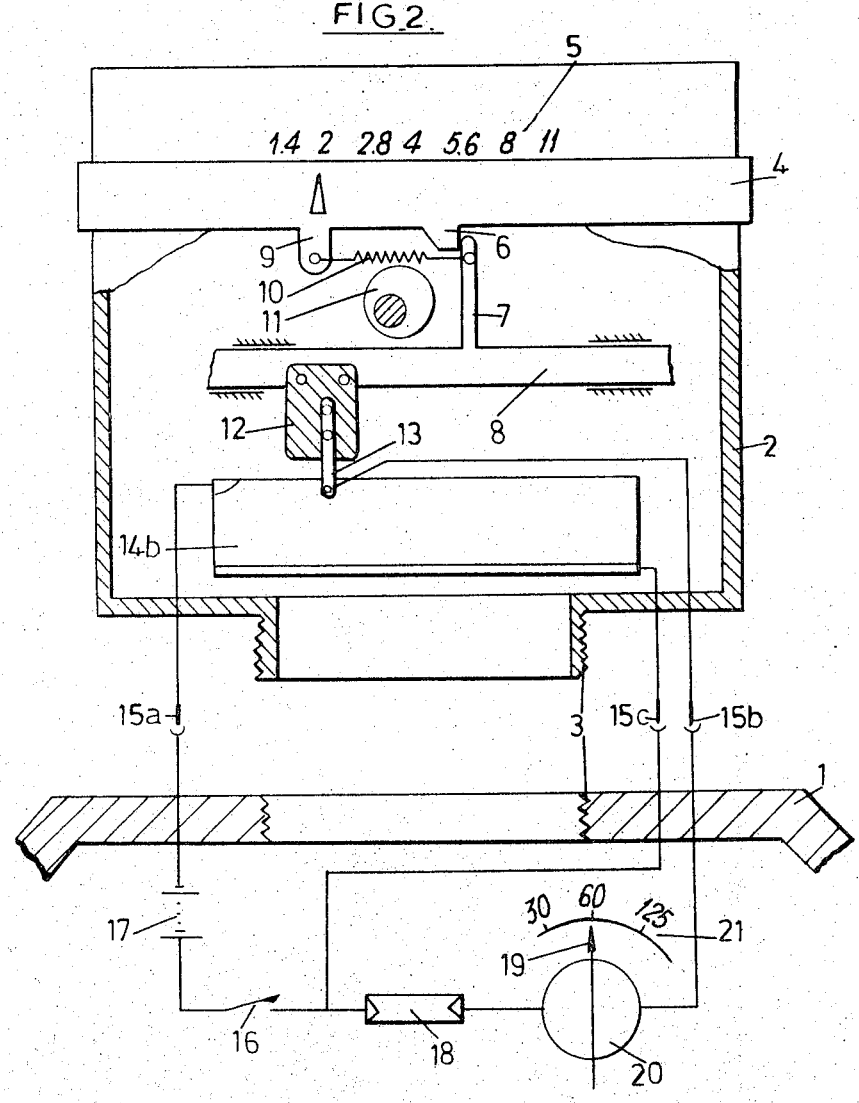
FIG. 2 shows an exponential voltage divider connected with the preselection setting device, a diaphragm value having been set which does not form the initial diaphragm.

The construction of the example shown in FIG. 2 is essentially the same. The only difference resides in the substitution of the exponential voltage divider 14b for the variable resistance 14a used in the version shown in FIG. 1.

The method of operation is as follows:

The closing of the switch 16 switches on the exposure measuring device. As mentioned at the beginning, the taking lens 2 incorporates a preselector diaphragm, so that regardless of the position of the preselection setting device 4 the photoconductive cell 18 is always illuminated with the maximum diaphragm aperture. If a photographic exposure time of 1/60 of a second is required (see FIG. 2) the diaphragm value corresponding to the degree of brightness prevailing will have been preselected when the indicator 19 of the galvanometer 20 is seen to be situated opposite the value 60 on the exposure time scale 21.

When the preselection setting device 4 is set to the diaphragm values not corresponding to the initial aperture, the spring 10 provides a connection between the entrainment device 6 of the preselection setting device 4 and the arm 7 of the slide carrier 8. As a result of this mechanical coupling the sliding contact 13 is moved along the slide track S together with the preselection setting device 4 (see FIG. 2). When the preselection setting device 4 is moved into the position corresponding to the initial aperture of the diaphragm (see FIG. 1) the slide carrier 8 is held up by the stop 11. When the preselection setting device 4 occupies the position corresponding to the initial aperture the connection between the entrainment device 6 and the arm 7 is nullified. Although the geometrically largest diaphragm aperture has been set by the preselection setting device 4, the diaphragm value which corresponds to the photometrically largest diaphragm aperture is electrically simulated, by the position of the sliding contact 13, on the exponential voltage divider 14b (or variable resistance 14a, as in FIG. 1, as the case may be). The stop 11 is accurately adjustable without difficulty, owing to the construction of the said stop 11 in the form of an adjusting eccentric.

By the aid of the adjustable stop 11 it is also possible to take into account that focal length of the taking lens 2 which is of significance for the internal exposure measurement with a fully opened diaphragm. As is known, it is important to take the focal length into consideration when the photoconductive cell 18 is situated outside the image plane of the taking lens 2.

I claim:

1. In a photographic camera comprising an objective lens having a preselectable aperture diaphragm, a diaphragm preselection setting device, an exposure measuring circuit including a moving coil, a photoelectric cell, a power source and a voltage adjustment device having a sliding contact, the provision of
   a. an entrainment member on said preselection setting device effective to move said sliding contact, and
   b. stop means for effecting arrest of said sliding contact in a position in which the electrical value corresponding to the photometric initial diaphragm is determined by the voltage adjustment device, the entrainment connection between the entrainment member and the sliding contact being nullified on arrest of said sliding contact.

2. A camera according to claim 1, wherein the stop means is an adjustable eccentric.

* * * * *